United States Patent [19]

Lin

[11] Patent Number: 4,913,935
[45] Date of Patent: Apr. 3, 1990

[54] POLYMER COATED ALUMINA

[75] Inventor: GwoChung Lin, McCandless Township, Allegheny County, Pa.

[73] Assignee: Aluminum Company of America, Pittsburgh, Pa.

[21] Appl. No.: 294,342

[22] Filed: Dec. 28, 1988

[51] Int. Cl.$^4$ ............................................... B05D 7/00
[52] U.S. Cl. ..................................... 427/221; 428/407
[58] Field of Search ........................... 427/221; 428/407

[56] References Cited

U.S. PATENT DOCUMENTS

| | | | |
|---|---|---|---|
| 3,065,185 | 11/1962 | Burns et al. | 252/428 |
| 3,664,967 | 5/1972 | Stehl | 252/431 R |
| 4,045,353 | 8/1977 | Kosaka et al. | 210/502 |
| 4,159,966 | 7/1979 | Roberts | 252/430 |
| 4,245,005 | 1/1981 | Regnier et al. | 428/420 |
| 4,315,958 | 2/1982 | Peiffer et al. | 427/214 |
| 4,324,681 | 4/1982 | House | 252/184 |
| 4,517,241 | 5/1985 | Alpert | 428/332 |
| 4,673,734 | 6/1987 | Tayot et al. | 530/364 |
| 4,786,628 | 11/1988 | Wieserman et al. | 502/401 |
| 4,788,176 | 11/1988 | Wieserman et al. | 502/401 |

OTHER PUBLICATIONS

Bien-Vogelsang, U. et al, "Syntheses of Stationary Phases for Reversed-Phase LC Using Silanization and Polymer Coating", Max-Planck-Institut, *Chromatographia*, vol. 19, pp. 170–179.

Schomburg, G. et al, "Immobilization of Stationary Liquids on Silica Particles by Gamma-Radiation", Max-Planck-Institut, *Chromatographia*, vol. 18, No. 5, 1984, pp. 265–274.

Figge, H. et al, "Stationary Phases for Reversed-Phase Liquid Chromatography, Coating of Silica by Polymers of Various Polarities", *Journal of Chromatography*, 351, 1986, pp. 393–408 (Max-Planck-Institut).

*Primary Examiner*—Michael Lusignan
*Attorney, Agent, or Firm*—Douglas G. Glantz

[57] ABSTRACT

The invention includes producing a stable polybutadiene film on an alumina support wherein the alumina contains an alumina having a habit or form of crystals formed during a precipitation of aluminum hydroxide from an alkali metal aluminate by preselecting and controlling the pH of the alkali metal aluminate and the addition of certain monohydric and polyhydric alcohols to the alkali metal aluminate solution. Precipitation is controlled to form crystals having a habit or form which varies from principally acicular to principally lamellar crystal forms. This alumina is (a) coated with polybutadiene to form a polymer film layer on the alumina support and (b) the polymer film layer is crosslinked to form a stable polybutadiene coated and crosslinked on a support of acicular or lamellar alumina.

20 Claims, 2 Drawing Sheets

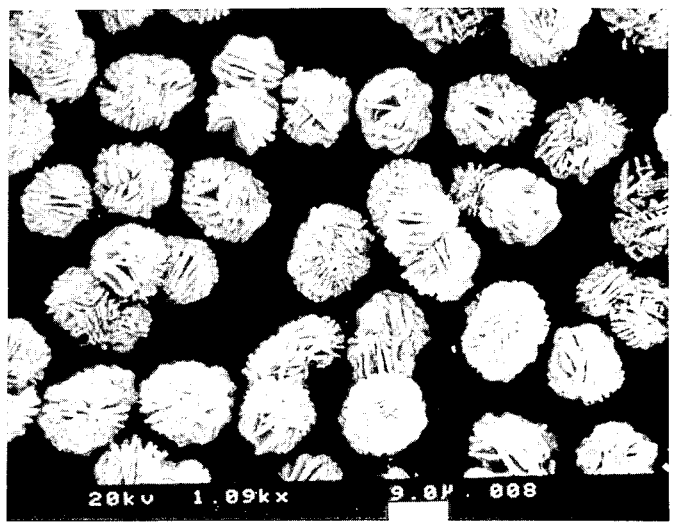
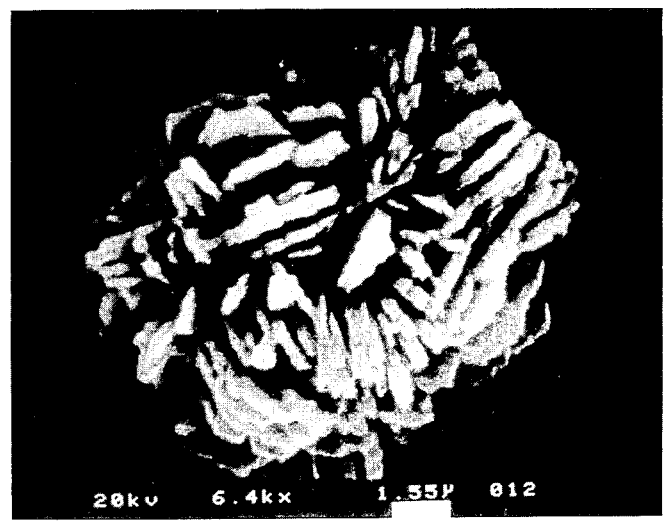

POLYMER COATED ALUMINA

BACKGROUND OF THE INVENTION

This invention relates to the production of a stable polymer coated alumina.

U.S. Pat. No. 4,045,353 discloses a solid support comprising an inorganic substrate with a polymerized layer. The substrate is preferably a particulate of 1 micron to 1 cm in diameter and is disclosed to be silica or alumina having a specific surface area of 100 to 300 m$^2$/g. The coating is formed by radiation-induced polymerization of a monomer disclosed to be a suitable polymerizable monomer, including the ethylenically unsaturated monomers (styrene monomer), fluorine monomer, silicon-containing monomer, acrylates, methacrylates, vinyl monomer, olefin monomers, diene monomers (butadiene, isoprene, 1,3-pentadiene, cyclopentadiene, chloroprene), aldehydes, ketones, cyclic ethers, or the like. The patent discloses that the suitable polymerization monomers can be selected to produce a polymer having certain desired functional groups and that such a polymer can be easily grafted on the substrate, which includes inorganic solid substrates of "silica, silica gel, alumina, diatomaceous earth, zeolite, porous glass, carbon black, active carbon, clay, etc."

U.S. Pat. Nos. 4,245,005 and 4,673,734 disclose an alumina substrate coated with a crosslinked amine, or aminated polysaccharide, respectively. The support includes a thin layer of adsorbate that is adsorbed to and crosslinked on an inorganic support material. An inorganic support of silica, alumina, or titania has the pellicular coating formed thereon with the coating being an amine crosslinked by a crosslinking agent of epoxy resin, bromide, or nitro alcohol (U.S. Pat. No. 4,245,005).

An article from the Max-Planck Institute for Chromatography discloses that coating and crosslinking procedures require reactions that are reproducible and the chemical properties and coatings should be variable with regard to chemical structure and thickness of the coating layers. The stationary phases should be chemically stable even under extreme conditions of mobile phase compositions, such as pH and temperature. Mechanical properties of particle sizes and geometry should not be changed by the chemical reactions applied for immobilization. A contribution of unreacted and uncoated regions on the surface should be low.

Silica-based support media have dominated the marketplace recently for reverse phase process applications, but the silica-based support media have shortcomings of relatively narrow operating pH ranges, i.e., in the range of about 2–8, and high pressure drop requirements. The narrow operating pH ranges of silica materials usually result in shorter column life, loss of separations versatility, and difficulty in cleanup with strong alkali and acid all of which contribute to higher costs associated with the silica for analytical, semi-preparative, and preparative purification of samples.

Aluminas have been referred to as classical support media for separations, but alumina has not been used extensively for hydrophobic selective separations, relatively speaking when compared to silica. Aluminas are different materials from silica in terms of reacting by chemical bonding to the alumina's surface by hydrocarbon groups such as alkyl and phenyl. The use of alumina as media for reverse phase separations has lagged behind the use of silica because of one major reason. Alumina is not easily converted to hydrophobic phases for selective separations via chemical bonding on the alumina surface. The prior art includes disclosures by researchers reporting the use of most silanization reagents used successfully with silica, but which show no reactivity toward aluminas. Although some chlorosilanes may react with alumina, the formed Al—O—Si—C bond is known to be highly unstable under reverse phase chromatographic conditions.

It is an object of the present invention to provide a process for producing a polymer coating on alumina.

It is another object of the present invention to provide a polymer coating for separations on an alumina-based support having a wide pH stability.

It is a further object of the present invention to provide a polymer coating and alumina support permitting separation of many acidic and basic compounds.

It is yet another object of the present invention to provide a polymer coating on an alumina-based support requiring only a low pressure drop for separations process applications.

These and other objects of the present invention will become apparent from the detailed description which follows.

SUMMARY OF THE INVENTION

The invention includes producing a stable polybutadiene film on an alumina support wherein the alumina contains an alumina having a habit or form of crystals formed during a precipitation of aluminum hydroxide from an alkali metal aluminate by preselecting and controlling the pH of the alkali metal aluminate and the addition of certain monohydric and polyhydric alcohols to the alkali metal aluminate solution. Precipitation is controlled to form crystals having a habit or form which varies from principally acicular to principally lamellar crystal forms. This alumina is (a) coated with polybutadiene to form a polymer film layer on the alumina support and (b) the polymer film layer is crosslinked to form a stable polybutadiene coated and crosslinked on a support of acicular or lamellar alumina.

BRIEF DESCRIPTION OF THE DRAWINGS

FIG. 2 shows scanning electron micrographs of polybutadiene coated and crosslinked on alumina support base in accordance with the present invention.

DETAILED DESCRIPTION

Figure 1:
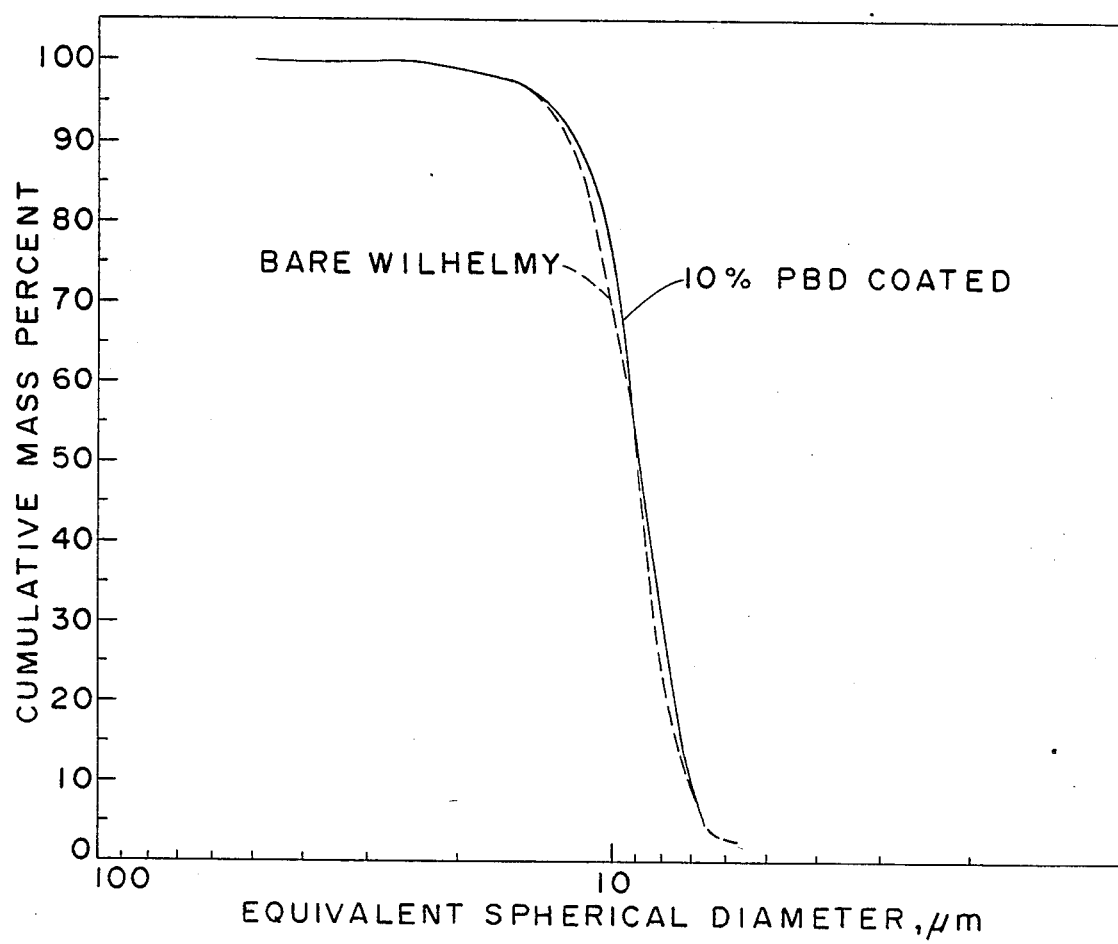
FIG. 1 shows particle size distribution plots for a bare alumina used as starting material in the present invention compared to polybutadiene coated and crosslinked on this alumina support base.

The present invention includes producing a stable polybutadiene (PBD) film on an alumina support base wherein the alumina contains acicular or lamellar alumina and is characterized as an alumina having a habit or form of crystals formed during a precipitation of aluminum hydroxide from an alkali metal aluminate by preselecting and controlling the pH of the alkali metal aluminate and the addition of certain monohydric and polyhydric alcohols to the alkali metal aluminate solution. Precipitation is controlled to form crystals having a habit or form which varies from principally acicular to principally lamellar crystal forms. The term "particle morphology" or "habit" are synonymous with the shape or form of a crystal, e.g., lamellar, tabular, equant, columnar, or acicular, as opposed to the crystal structure or system, e.g., tetragonal, orthorhombic, or monoclinic. While the crystal structure determines the number and types of crystalline faces, the morphology or habit is determined by the relative growth rates of the crystalline faces, with the fastest growing faces disappearing while slower growing faces define the final shape. This alumina is formed by controlling the morphology or habit of aluminum hydroxide crystals to permit the respective free production of crystals which are principally lamellar in the form of flat platelets or principally acicular in the form of needle-like structures as well as intermediate forms. The alumina used in the present invention sometimes is referred to as Alcoa Wilhelmy alumina. A more complete description of the alumina is provided in the related co-pending U.S. patent application by Richard B. Wilhelmy, U.S. Ser. No. 022,735 filed Mar. 6, 1987, which is hereby incorporated by reference and intended to be a part hereof as if it had been included in its entirety. This patent application, U.S. Ser. No. 022,735, currently is under notice of allowance.

The present invention includes the production of a uniform, crosslinked polybutadiene coating on the particular alumina particles by producing a polybutadiene coating and immobilizing the polybutadiene coating on the alumina by polymeric crosslinking. Immobilization in the present invention is performed by crosslinking with chemical radical reactions, initiated by thermal decomposition of a radical starter or radical generator. In one aspect, the radical starter can be provided by dicumylperoxide.

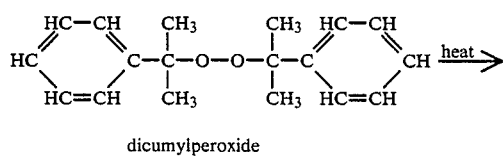

dicumylperoxide

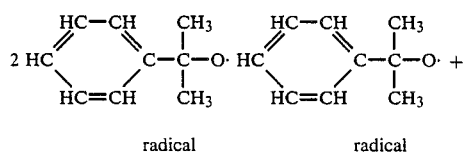

radical        radical

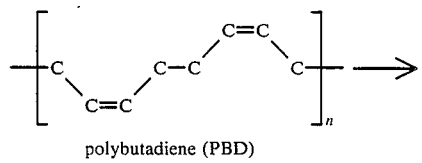

polybutadiene (PBD)

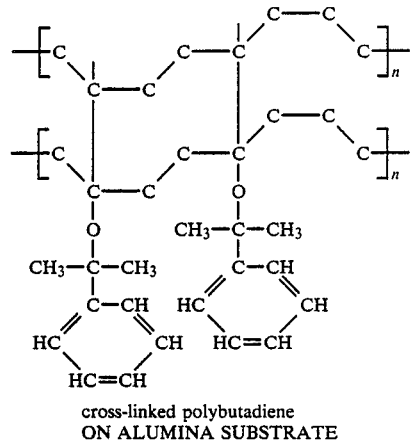

cross-linked polybutadiene
ON ALUMINA SUBSTRATE

The crosslinked polymer film layer must be controlled to be uniform. A radical generator (starter) is used to form a stable crosslinked polymer film layer. The radical generator should be kept at full strength before the crosslinking takes place. The loss of activity of radical generator will result in a decreased crosslinking efficiency, and poor uniformity of the polymer film layer. The present invention includes using dicumylperoxide for the radical generator. Since dicumylperoxide decomposes at moderately elevated temperatures, the temperatures must be held below 30° C. and preferably below 25° C. for both coating and drying steps.

The present invention requires several important factors to be controlled in the preparation of the stable and efficient polymer coated alumina support of the present invention. The polymer film coating on the surface is controlled to be homogeneous. Any clots formed before, during, or after the coating are to be controlled to avoid non-uniform film deposition. The non-film deposition will decrease column efficiency and stability. I have found that sonication of particles in the polymer solution of at least 15 minutes, preferably at least 20 minutes, and in one aspect preferably 30 minutes, must be applied before evaporating the solvent. In the evaporation process, the rate of solvent evaporation should be low, e.g., such as less than about two volume percent (2%) per minute of solvent used. The present invention includes avoiding any vigorous boiling of the solvent.

The present invention requires a solvent for coating having only a minimal water content. The role of the water content in the solvent adversely affects the polymer coating and crosslinking reaction. The present invention includes producing the polymer coating on the alumina substrate with fresh dehydrated solvent, e.g., such as pentane, containing less than about 1 ppm water, preferably less than 0.5 ppm water.

Unreacted polymer in the process of the present invention should be removed to minimal levels. The characteristic retention of samples to be separated is generally a function of liquid phase structure, as well as loading. The complete removal of unreacted polymer in the packing is essential for reproducible result. Unreacted polymer is removed by washing with a combination of solvents, including heptane, methylene chloride, acetone, and isopropyl alcohol as needed. The coated particles are packed in a tube, and the solvent is pumped through a tube at a flow rate of about 2–3 ml/min for at least 30 minutes for each solvent.

The present invention includes producing separations media which are usable at a very wide range of pH, e.g., such as a pH range from about 2 to 12 and at a low pressure drop requirement for separations applications in packed columns.

Alumina-based reverse phase support media in the polymer coating on the particular alumina in accordance with the present invention for separations applications have preferred properties including a wide pH stability and a low pressure drop in the column. The wide pH stability permits separation of many acidic and basic compounds by ion-suppression rather than by ion-pairing techniques. A low pressure drop resistance of the polybutadiene on the particular alumina of the present invention is highly preferred in separation and purification applications to permit processing at a lower potential of pressure head.

EXAMPLE

In an amount within the range of three to fifteen grams (3–15 g), alumina particles sometimes referred to as Wilhelmy alumina or Alcoa Wilhelmy alumina obtained from the Alcoa Technical Center, Alcoa Center, Pennsylvania 15069 were suspended in a 250 ml round flask of n-pentane solution (100–150 ml) containing 10% to 20% by weight of polybutadiene oligomer (molecular weight of about 3400) and 2% of dicumylperoxide by weight with respect to the polybutadiene. Polybutadiene was phenyl terminated, 99% unsaturated, 25% vinyl, 40% trans-1,4, average molecular weight of about 3400.

Sonication was applied to the mixture for about 30 minutes. The pentane was evaporated slowly with the rotary evaporator connected to an aspirator to accelerate the evaporation process. The evaporation process was carried out at ambient temperature to prevent losing the activity of dicumylperoxide. The polybutadiene coated alumina was transferred into a stainless steel column and purged with dry nitrogen at a flow rate of about 10 ml per minute overnight. Crosslinking was performed in a temperature programmable oven by elevating the oven temperature to about 170° C. at a rate of about 5° C. per minute and held for 2 hours. Polymer coated and crosslinked particles produced by this procedure were washed with up to about 200 ml each of heptane and methylene chloride to remove unreacted polybutadiene. The washed particles were placed into the flask and dried with a rotary evaporator for at least about 4 hours. The polybutadiene coated Alcoa Wilhelmy alumina particles were analyzed and the physical characterization of the particles presented in Table I.

TABLE I

Physical Characteristics of Alcoa Wilhelmy Alumina Before and After PBD Coating

| Parameter | PBD Coating before | PBD Coating after |
|---|---|---|
| % PBD Loading | 0 | 9% |
| Average Particle Diameter, micrometers | 9 | 9 |
| Surface Area, m$^2$/g | 37.12 | 29.58 |

Particle size generally did not change before and after coating. The accumulative mass percent particle size distribution plots for the Alcoa Wilhelmy alumina before and after polybutadiene coating are illustrated in FIG. 1. The average particle size of the Alcoa Wilhelmy alumina was around 9 microns, and at least 50% of the particles were in the size range of 8 to 10 microns.

A scanning electron micrograph of polybutadiene coated Alcoa Wilhelmy alumina revealed no structural defects of particles after coating and crosslinking (from the spherical and relatively narrow particle size distribution of bare Alcoa Wilhelmy alumina). The micrograph is illustrated in FIG. 2. An electron micrograph of the particles at higher magnification is shown in FIG. 2 also.

Surface areas were determined by nitrogen BET. The surface areas of bare Alcoa Wilhelmy particles and 9% polybutadiene coated Alcoa Wilhelmy particles were about 37.12 m$^2$/g and about 29.58 m$^2$/g, respectively. A decrease of about 20% was observed after coating. The decrease of surface area was attributable to the plugging of small pores by the polybutadiene oligomers. Smaller molecular weight polybutadiene oligomer can be used to reduce pore plugging.

While the invention has been described in terms of preferred embodiments, the claims appended hereto are intended to encompass all embodiments which fall within the spirit of the invention.

What is claimed is:

1. A process for producing polybutadiene coated alumina particles wherein the alumina contains an alumina having a habit or form of crystals formed during a precipitation of aluminum hydroxide from an alkali metal aluminate by preselecting and controlling the pH of the alkali metal aluminate and the addition of certain monohydric and polyhydric alcohols to the alkali metal aluminate solution comprising:

(a) coating an alumina having a habit or form of crystals formed during a precipitation of aluminum hydroxide from an alkali metal aluminate by preselecting and controlling the pH of the alkali metal aluminate and the addition of certain monohydric and polyhydric alcohols to the alkali metal aluminate solution with a solution of polybutadiene, radical generator, and solvent to form a polymer film layer on an acicular or lamellar alumina-based support, and (b) crosslinking said film layer to form a stable polybutadiene coating on said alumina-based support.

2. A process as set forth in claim 1 wherein said coating forms a polymer film layer comprising a substantially homogeneous film layer.

3. A process as set forth in claim 2 wherein said coating step includes sonicating said polybutadiene solution for at least about 30 minutes and then evaporating said solvent.

4. A process as set forth in claim 3 wherein said solvent is pentane and said evaporating is controlled to have a low rate, less than about 2 volume % of pentane used per minute.

5. A process as set forth in claim 4 wherein said evaporating temperature is controlled to remain below 30° C.

6. A process as set forth in claim 5 further including a drying step to remove solvent from the coated particles at a temperature below about 30° C.

7. A process as set forth in claim 6 wherein said crosslinking is uniform.

8. A process as set forth in claim 7 wherein said radical generator is at or about full strength.

9. A process as set forth in claim 8 wherein said radical generator is dicumylperoxide.

10. A process as set forth in claim 9 comprising controlling water content in pentane to minimal levels below about 5 ppm.

11. A process as set forth in claim 10 further comprising controlling water content in said pentane to a level below about 1 ppm.

12. A process as set forth in claim 11 further comprising removing unreacted polymer.

13. A process as set forth in claim 12 comprising washing with an organic solvent.

14. A process as set forth in claim 13 wherein said washing comprises washing with heptane, methylene chloride, acetone, or isopropyl alcohol.

15. A process as set forth in claim 14 wherein said washing comprises at least two discrete washings carried out for at least about 30 minutes each.

16. A process for producing polybutadiene coated alumina useful over a wide pH range at lower pressure drop requirements in a packed separations column comprising:
   (a) coating an alumina having a habit or form of crystals formed during a precipitation of aluminum hydroxide from an alkali metal aluminate by preselecting and controlling the pH of the alkali metal aluminate and the addition of certain monohydric and polyhydric alcohols to the alkali metal aluminate solution with a polybutadiene in pentane solution to form a polymer film layer on said alumina as support base, and
   (b) immobilizing said polymer film layer by crosslinking with a chemical radical generator to form a stable polybutadiene coating on said alumina.

17. A process as set forth in claim 16 wherein said polymer film layer is substantially homogeneous, said crosslinking is substantially uniform.

18. A process as set forth in claim 17 wherein said coating is performed including sonication for at least about 30 minutes before evaporating the pentane at a rate of less than about 2 volume per cent per minute.

19. A process as set forth in claim 18 wherein said coating step is conducted at a temperature below about 25° C.

20. A process for producing a stable polybutadiene coated on a support base of an alumina having a habit or form of crystals formed during a precipitation of aluminum hydroxide from an alkali metal aluminate by preselecting and controlling the pH of the alkali metal aluminate and the addition of certain monohydric and polyhydric alcohols to the alkali metal aluminate solution comprising:
   (a) coating said alumina with a polybutadiene by suspending said alumina in a reactor of solution containing polybutadiene, dicumylperoxide, and solvent, sonicating the solution for about 30 minutes, and evaporating solvent slowly in a rotary evaporator connected to an aspirator to accelerate the evaporation process, said evaporation taking place at a temperature below about 25° C.,
   (b) drying the polybutadiene coated particles with dry nitrogen at a temperature below about 25° C.,
   (c) crosslinking and immobilizing the polybutadiene coated alumina in a temperature programmable oven starting at about 25° C. and heating to about 170° C. at a rate of about 5° C. per minute to form a stable polybutadiene coated and crosslinked alumina product, and
   (d) washing the polybutadiene coated and crosslinked alumina product with a heptane and methylene chloride to remove unreacted polybutadiene.

* * * * *